United States Patent
Yu

(10) Patent No.: US 6,979,122 B2
(45) Date of Patent: Dec. 27, 2005

(54) DEFLECTABLE PROBE AND THERMOMETER

(75) Inventor: Chu Yih Yu, Taipei Hsien (TW)

(73) Assignee: Mesure Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 10/788,806

(22) Filed: Feb. 27, 2004

(65) Prior Publication Data

US 2005/0047478 A1    Mar. 3, 2005

Related U.S. Application Data

(60) Provisional application No. 60/498,780, filed on Aug. 29, 2003.

(51) Int. Cl.[7] ............. G01K 1/00; G01K 1/14; A61B 5/00
(52) U.S. Cl. ............. 374/208; 374/163; 600/474; 600/549
(58) Field of Search ............. 374/163, 208, 374/170, 151; 600/474, 549

(56) References Cited

U.S. PATENT DOCUMENTS

| 3,946,613 | A |   | 3/1976  | Silver ............. 73/362 |
| 4,765,014 | A | * | 8/1988  | Moss et al. ............. 15/229.3 |
| 4,821,417 | A | * | 4/1989  | Levine ............. 30/298 |
| 4,955,136 | A | * | 9/1990  | Diaz-Rivera ............. 30/32 |
| 5,133,606 | A | * | 7/1992  | Zaragoza et al. ............. 374/208 |
| 5,397,304 | A | * | 3/1995  | Truckai ............. 604/528 |
| 5,458,121 | A | * | 10/1995 | Harada ............. 600/474 |
| 5,479,951 | A | * | 1/1996  | Denebeim ............. 132/265 |
| 5,728,091 | A | * | 3/1998  | Payne et al. ............. 606/15 |
| 6,406,182 | B1| * | 6/2002  | Chen ............. 374/208 |
| 6,637,935 | B2| * | 10/2003 | Chen ............. 374/185 |
| 2002/0081552 | A1 | * | 6/2002  | Stanwich et al. ............. 433/149 |
| 2003/0212339 | A1 |   | 11/2003 | Lussier et al. |
| 2003/0212340 | A1 | * | 11/2003 | Lussier et al. ............. 600/549 |
| 2004/0146087 | A1 | * | 7/2004  | Penney et al. ............. 374/170 |
| 2004/0181243 | A1 | * | 9/2004  | Chu et al. ............. 606/144 |
| 2004/0264546 | A1 | * | 12/2004 | Wong et al. ............. 374/209 |

* cited by examiner

*Primary Examiner*—Gail Verbitsky
(74) *Attorney, Agent, or Firm*—Thomas, Kayden, Horstemeyer & Risley

(57) ABSTRACT

A deflectable probe for use in a thermometer. The deflectable probe is constituted by a bendable probe body and a hollow tip member secured thereto. Furthermore, a deflectable member includes a main portion disposed in the bendable probe body. When the bendable probe body is subjected to a force, deformation of the main portion occurs. In particular, the deformation cannot be undone by a return force from the bendable probe body when the applied force is removed, so that the bendable probe body is sustained in a bent form.

16 Claims, 7 Drawing Sheets

US 6,979,122 B2

DEFLECTABLE PROBE AND THERMOMETER

CROSS-REFERENCE TO RELATED APPLICATIONS

This application claims the benefit of U.S. Provisional Application Ser. No. 60/498,780, filed on Aug. 29, 2003 and entitled "Deflectable Probe and Thermometer," which is incorporated by reference herein in its entirety.

BACKGROUND OF THE INVENTION

1. Field of the Invention

The invention relates to the field of thermometers, and more particularly to the field of medical thermometers employing a thermal probe for measurement of a patient's temperature, although it is equally applicable to other temperature measurement fields.

2. Description of the Related Art

Electronic thermometers generally offer a great number of advantages over conventional glass and mercury thermometers for use in the health care field. Among the advantages of electronic thermometers are the elimination of sterilization procedures for glass thermometers, made possible by the use of disposable covers; elimination of the possibility of broken glass if a thermometer is dropped; a digital temperature display to eliminate temperature reading errors; and with proper circuit design and calibration, higher accuracy and resolution is possible with accurate measurement and display of tenths of a degree Fahrenheit being easily attainable.

However, most probes used in existing electronic thermometers are rigid thereby presenting a danger of injury to the patient, especially in the case of small children where the thermometer is generally used rectally. U.S. Pat. No. 3,946,613 discloses an electronic thermometer with a flexible probe which is safe and not a danger to patients, particularly children. Because the prior-art probes are not deflectable, they nonetheless tend to recover their original shapes and remain straight with the thermometer body. The lack of the capability of being deflected is very annoying when a body cavity being measured cannot accommodate the longitudinal dimension of the flexible probe. Another disadvantage is that the flexible probe's shape cannot be well adapted to the body cavity being measured for bed-bound patients or children.

SUMMARY OF THE INVENTION

It is an object of the present invention to provide a thermometer with a deflectable probe to overcome the limitations of the prior art. The use of a deflectable member allows the inventive probe to be easily adapted to a patient's body cavity being measured. Furthermore, a main portion of the deflectable member is constructed by a deflectable metal wire which is preferably made of copper having a diameter of about 0.5 to 2.0 mm. In this manner, the inventive probe can be easily deflected and sustained in a bent form, thereby enhancing the probe life.

According to one aspect of the invention, a deflectable thermometer probe comprises a bendable probe body, a hollow tip member and a deflectable member. The hollow tip member having a thermal contact surface is secured to the bendable probe body. The deflectable member includes a main portion disposed in a hollow pipe of the bendable probe body.

According to another aspect of the invention, the hollow pipe provides a space for deformation of the main portion of the deflectable member. In one embodiment, the hollow pipe has at least a portion with a diameter greater than that of the main portion of the deflectable member. Preferably, a protecting head is formed at a front end of the deflectable member. Furthermore, a groove is defined in the bendable probe body's end portion and a corresponding hook formed at a back end of the deflectable member is embedded in the groove.

When the bendable probe body is subjected to a force, deformation of the main portion occurs. In particular, the deformation cannot be undone by a return force from the bendable probe body when the applied force is removed, so that the bendable probe body is sustained in a bent form.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1A:
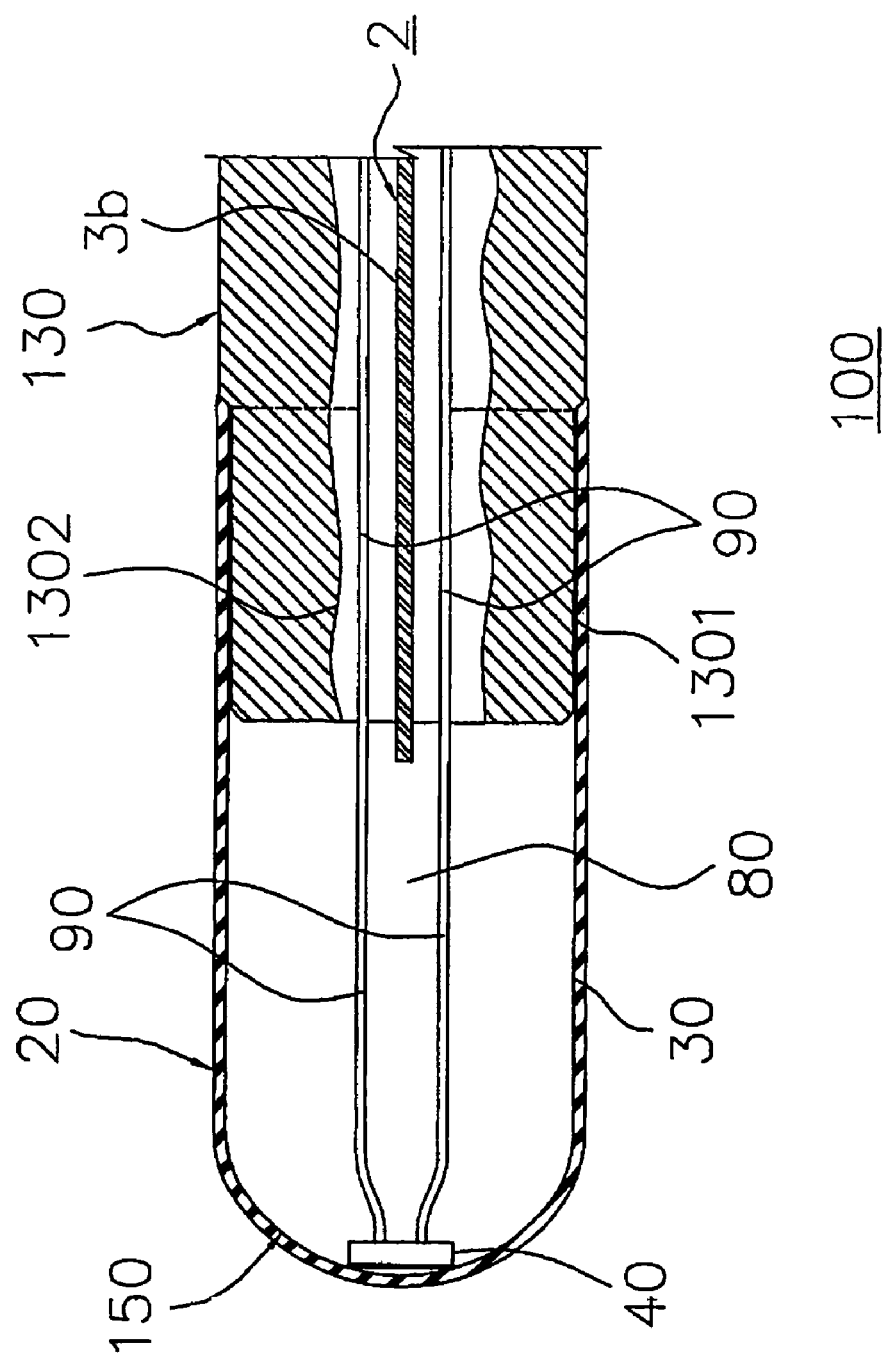
FIG. 1A is an enlarged cross-sectional view of a deflectable probe according to an embodiment of the invention.

Referring to FIG. 1A, a deflectable probe 100 is composed of a bendable probe body 130 and a hollow tip member 20 secured to the probe body 130. The bendable probe body 130 is typically made of a plastic or rubber material. The hollow tip member 20 includes a thermal contact surface 30 surrounding a hollow cavity 80. In one embodiment, the hollow tip member 20 is preferably made of metal with high thermal conductivity, such as stainless steel.

A thermal sensor 40 is placed at the end 150 of the hollow tip member 20 and mounted on the inside of the thermal contact surface 30. The thermal sensor 40 is capable of sensing the temperature of the thermal contact surface 30 to yield a temperature signal. There are a set of lead wires 90 coupled to the thermal sensor 40 for transmission of the temperature signal.

A deflectable member designated numeral 2 in FIG. 1A includes a main portion 3b disposed in the bendable probe body 130. When the bendable probe body 130 is subjected to a force, deformation of the main portion 3b occurs. When the applied force is removed, the deformation cannot be undone by a return force from the bendable probe body 130. Thus, the bendable probe body 130 is sustained in a bent form after release of the force.

Further, the bendable probe body 130 includes a hollow pipe 1302 to hold the deflectable metal wire 2. The lead wires 90 are also designed to run through the hollow pipe 1302.

Figure 1B:
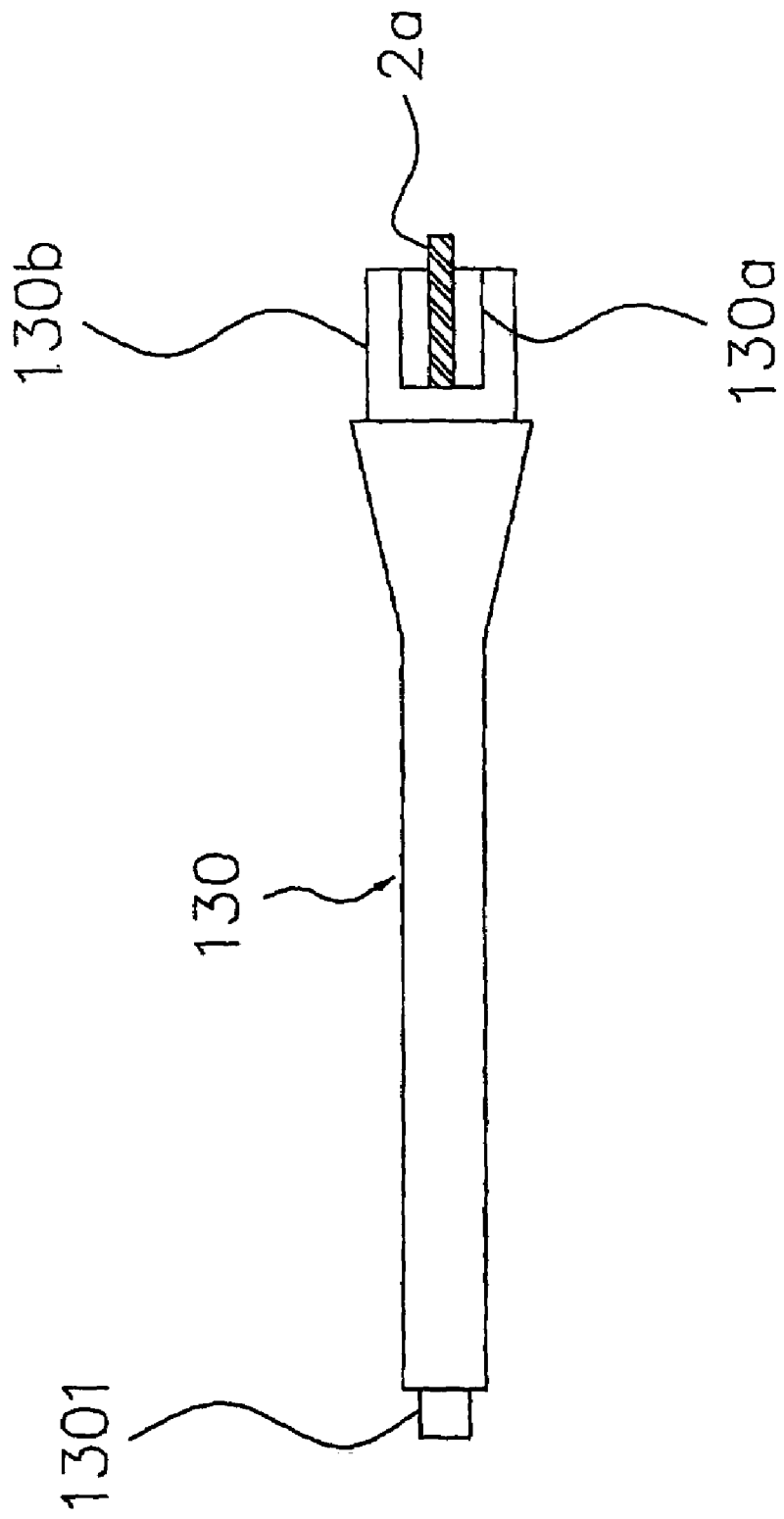
FIG. 1B is a cross-sectional view of a bendable probe body of FIG. 1A.

Note that the main portion 3b of the deflectable member 2 is constructed by a deflectable metal wire 2 which is made of deflectable metal like copper. Turning to FIG. 1B, a groove 130a is preferably defined in the sidewall of the bendable probe body's end portion 130b while a corresponding hook 2a is formed at an end of the deflectable metal wire 2. The hook 2a can embed itself in the groove 130a to firmly fix the deflectable metal wire 2.

Referring again to FIG. 1A, a recess 1301 is defined in the outer surface of the bendable probe body's front end portion. The back end portion of the hollow tip member 20 has its inner surface adapted to receive the recess 1301 of the bendable probe body 130 for formation of a lap joint.

Figure 2:
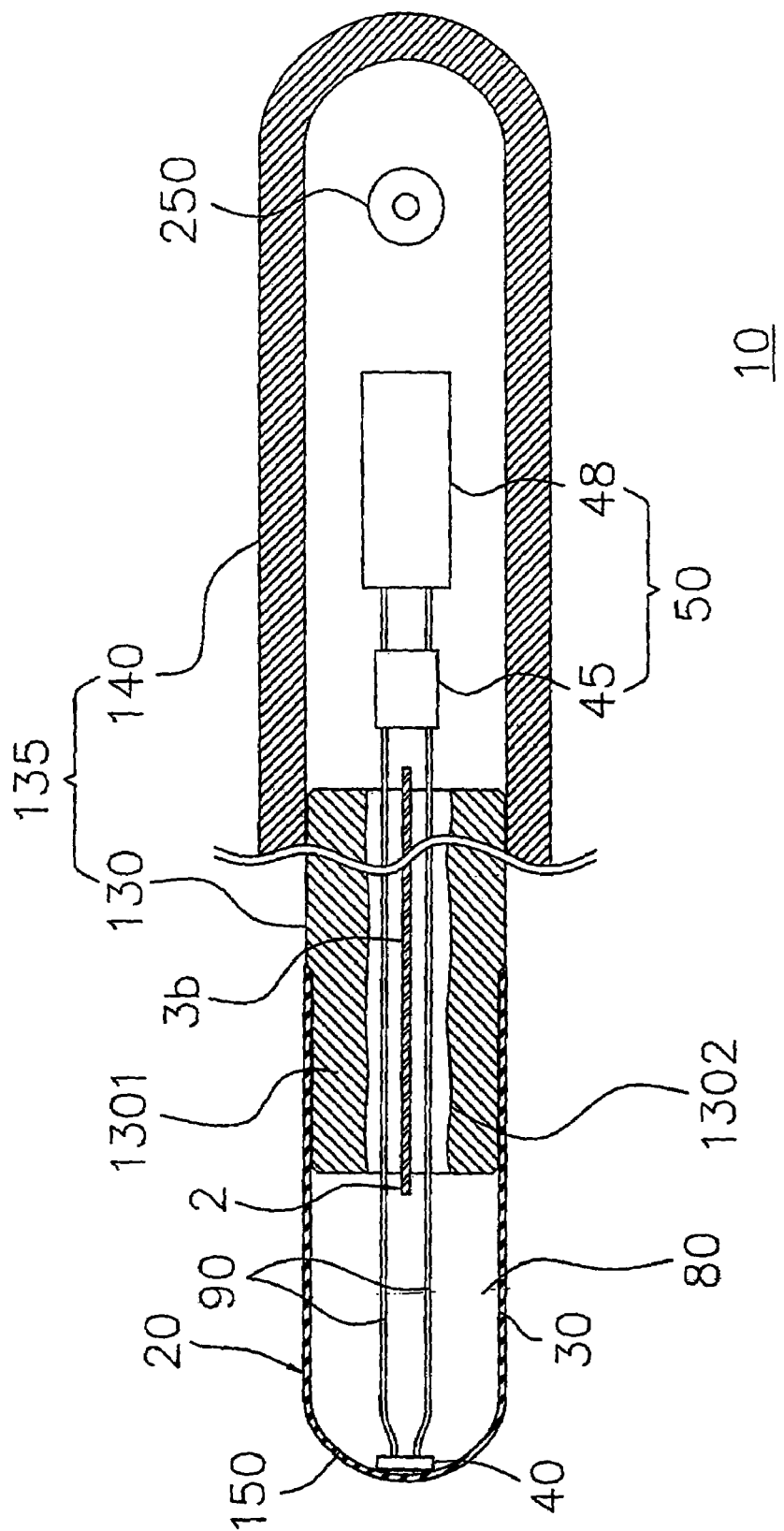
FIG. 2 is a fragmentary cross-sectional view of a thermometer according to the invention.

Referring to FIG. 2, an embodiment of a thermometer having a deflectable probe is illustrated. The thermometer 10 is made up of a body member 135 and a hollow tip member 20. In FIG. 2, the hollow tip member 20 is shown in an enlarged view for detailed description. The body member 135 includes a bendable probe body 130 and a display portion 140. The hollow tip member 20 is secured to the bendable probe body 130 of the body member 135; it contains a thermal contact surface 30 surrounding a hollow cavity 80. In one embodiment, the hollow tip member 20 is preferably made of metal with good thermal conductivity, such as stainless steel.

A thermal sensor 40 is placed at the end 150 of the hollow tip member 20 and mounted on the inside of the thermal contact surface 30. The thermal sensor 40 senses the temperature of the thermal contact surface 30 and produces a temperature signal. There are a set of lead wires 90 coupled to the thermal sensor 40 for transmission of the temperature signal.

A display means 50 is mounted on the display portion 140. The display means 50 comprises a display 48 and circuitry 45 coupled to the display 48. The circuitry 45 is connected to the lead wires 90 to receive the temperature signal; it drives the display 48 to show a corresponding temperature reading. The thermometer 10 also includes a switch 250 to turn on and off the display means 50.

Figure 3:
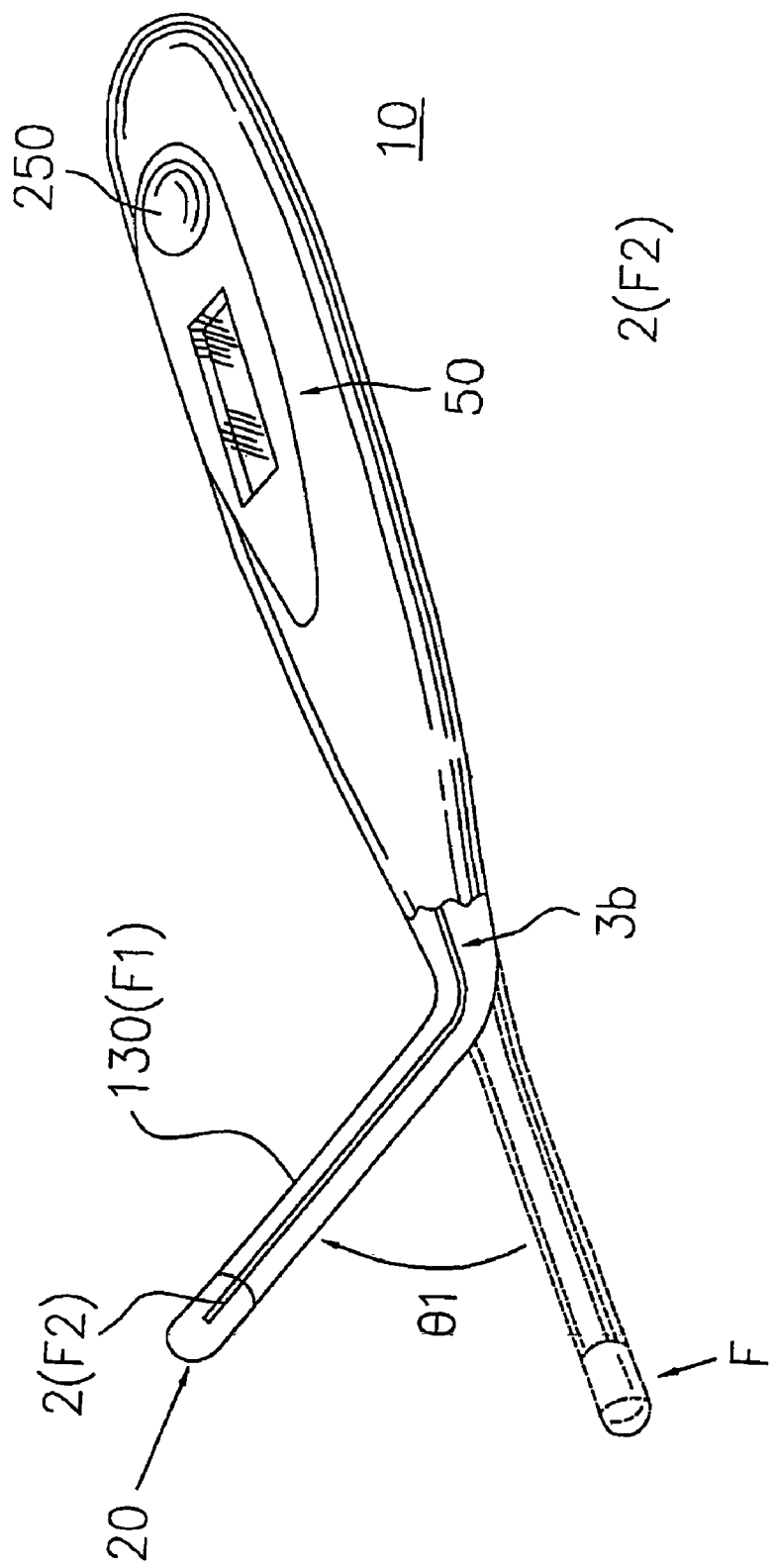
FIG. 3 is perspective view of the thermometer according to the invention, where the bendable probe body is subjected to a sufficient force.
Figure 4:
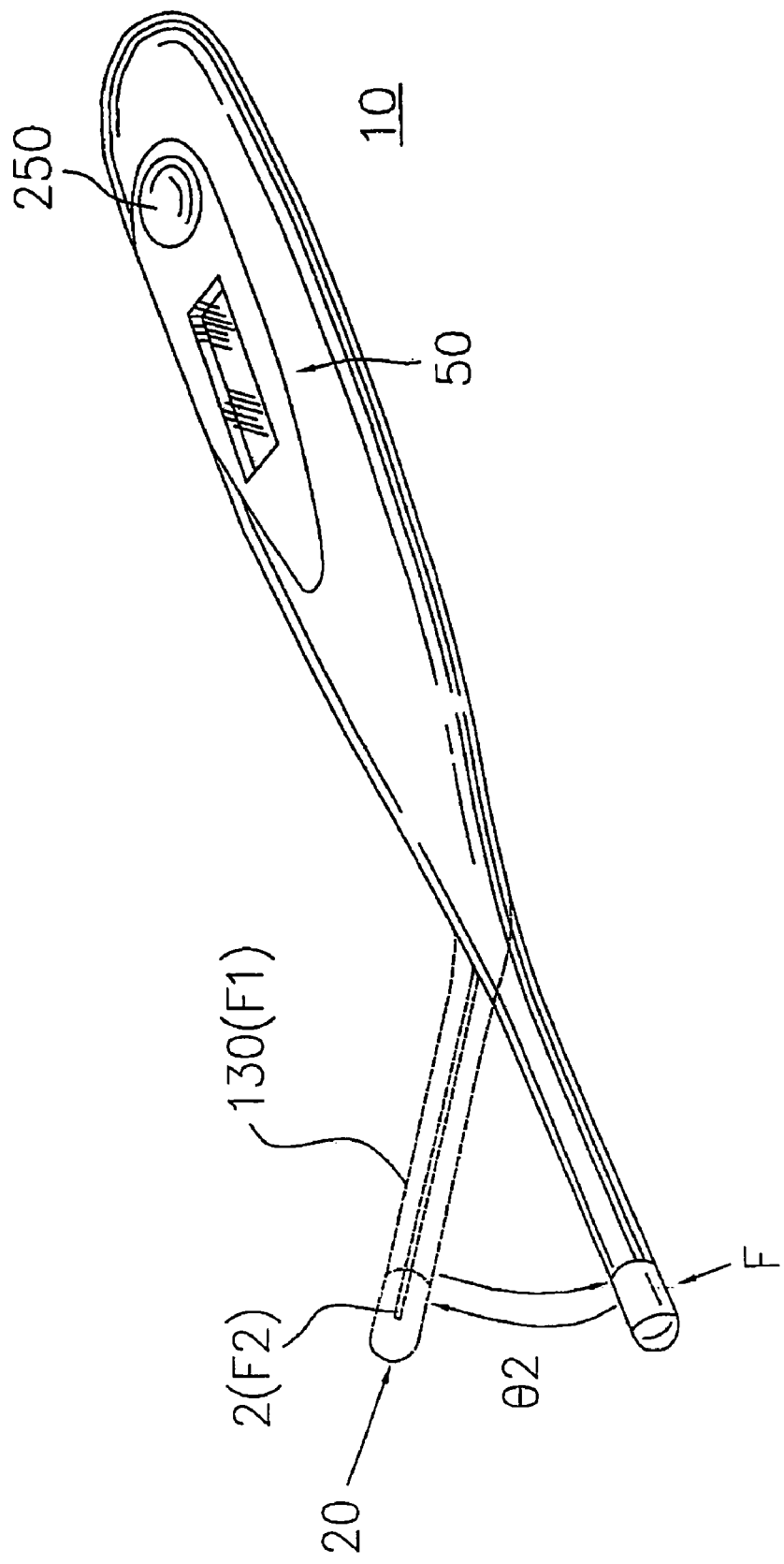
FIG. 4 is perspective view of the thermometer according to the invention, where the bendable probe body is subjected to an insufficient force.

The features of the embodiment will now be described in conjunction with FIGS. 2 through 4. A deflectable member 2 includes a main portion 3b disposed in the bendable probe body 130. When the bendable probe body 130 is subjected to a force F, deformation of the main portion 3b occurs. As shown in FIG. 3, the main portion 3b is deformed by a deflection angle of $\theta 01$. When the applied force F is removed, the deformation cannot be undone by a return force F1 from the bendable probe body 130. As a result, the bendable probe body 130 is sustained in a bent form after release of the force F.

Note that the main portion 3b of the deflectable member 2 is constructed by a deflectable metal wire 2 which is made of deflectable metal like copper. The latter embodiment is similar to that of FIG. 1B where a groove is preferably defined in the sidewall of the bendable probe body's end portion while a corresponding hook is formed at an end of the deflectable metal wire 2. The hook can embed itself in the groove to firmly fix the deflectable metal wire 2 in the bendable probe body. Further, the bendable probe body 130 includes a hollow pipe 1302 to hold the deflectable metal wire 2. The lead wires 90 are also designed to run through the hollow pipe 1302.

Referring again to FIG. 2, a recess 1301 is defined in the outer surface of the bendable probe body's front end. The back end portion of the hollow tip member 20 has its inner surface adapted to receive the recess 1301 of the bendable probe body 130 for formation of a lap joint.

According to the embodiment, the hollow tip member 20 is preferably made of thin metal with good thermal conductivity, such as silver, platinum, or stainless steel. The hollow tip member 20 is made in the form of a tubular shape and closed at a domed, hemispherical or hemiellipsoid shaped end. The hollow tip member 20 also includes a thermal contact surface 30 surrounding a hollow cavity 80. The contact surface 30 is brought in contact with flesh of a patient so that heat can be transferred from the patient's flesh to the hollow tip member 20. In one embodiment, the thermal sensor 40 is thermistor. The lead wires 90 and the thermistor 40 are both adhered on the inside of the thermal contact surface 30 with heat conductive glue. The glue is an insulating material with good thermal conductivity, e.g., epoxy resin. Moreover, the lead wires 90 are made up of a pair of electrical lead wires; they are used to connect the thermal sensor 40 to the circuitry 45.

However, the lead wires 90 might be easily to be cut off when the deflectable metal wire 2 is pushed into the hollow cavity 80. To overcome the aforementioned issue, the hollow pipe provides a space 1303 for the deformation of the main portion of the deflectable member to prevent the deflectable member 2 being pushed into the hollow cavity 80. To enhance the effect, the hook 2a can embed itself in the groove 130a to firmly fix the deflectable metal wire 2 in the bendable probe body 130 as FIG. 1B.

Figure 5:
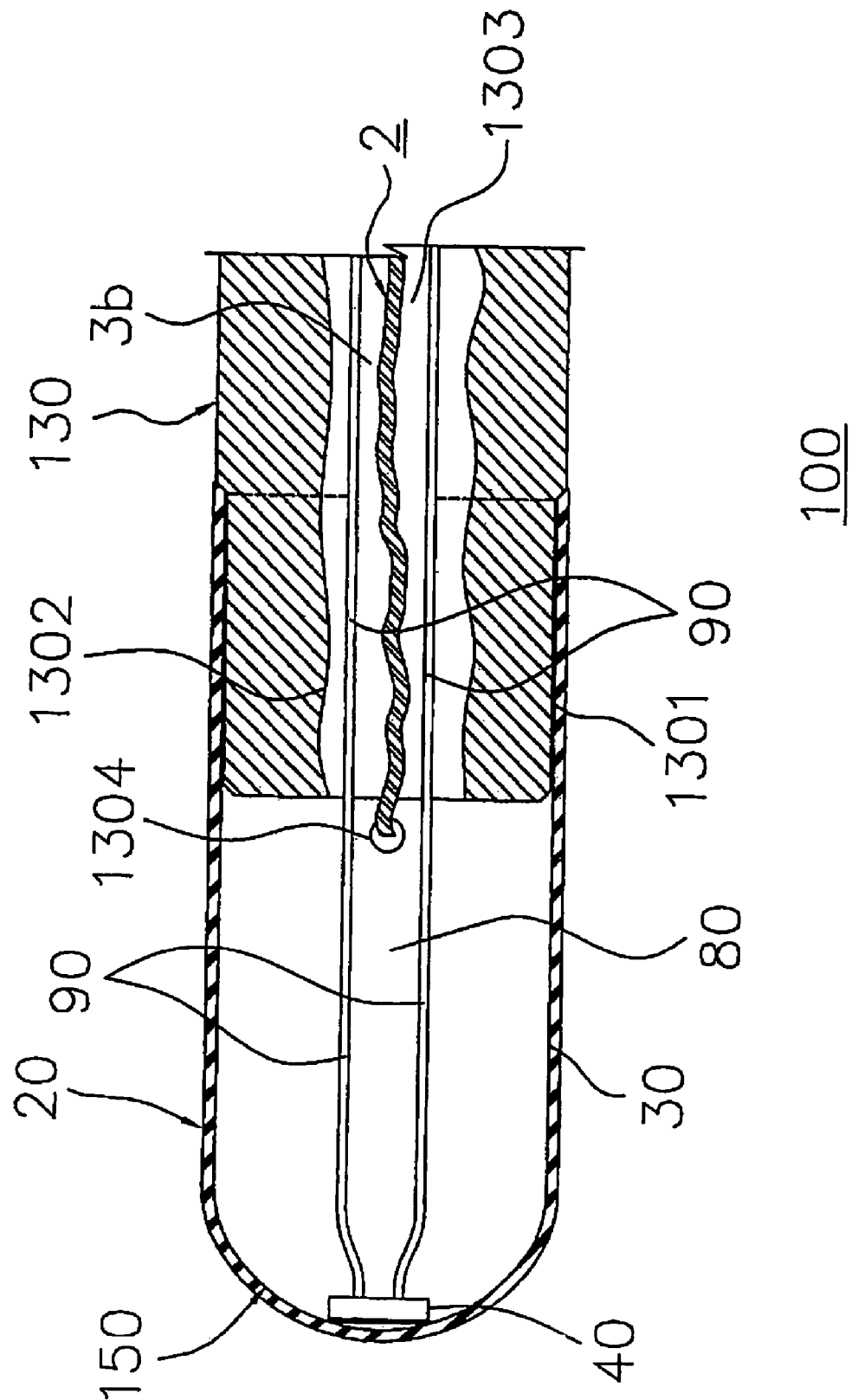
FIG. 5 is an enlarged cross-sectional view of a deflectable probe according to an embodiment of the invention.
Figure 6:
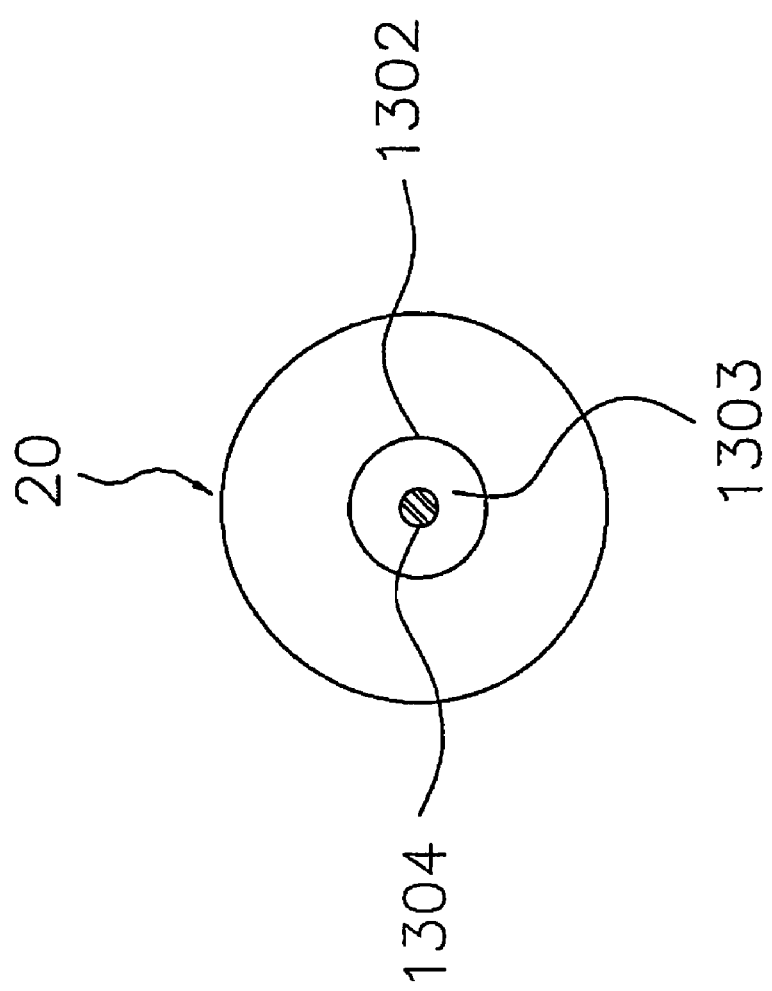
FIG. 6 is a side cross-sectional view of a bendable probe body of FIG. 5.

Referring to FIG. 5 and FIG. 6, preferably, the hollow pipe 1302 has at least a portion with a diameter greater than that of the main portion 3b of the deflectable member 2. Further, a protecting head 1304 is formed at a front end of the deflectable member 2. The protecting head 1304 is disposed in the hollow tip member 20 to avoid the deflectable member 2 cutting off the lead wires 90.

From FIG. 3, it can be seen that deformation of the main portion 3b occurs when the bendable probe body 130 is subjected to a force F. Consequently, the main portion 3b is deformed by a deflection angle of $\theta 1$. Because a deflection force F2 is greater than a return force F1 from the bendable probe body 130, the deflection angle of $\theta 1$ cannot be undone by the return force F1 when the applied force F is removed. As a result, the bendable probe body 130 is sustained in a bent form after release of the force F.

In contrast, the main portion 3b is deflected by a smaller angle of $\theta 2$ if the applied force F is insufficient. In this case, the deflection force F2 is less than the return force F1 from the bendable probe body 130, so the deflection angle of $\theta 2$ can be undone by the return force F1 when the applied force F is removed. Therefore, the bendable probe body 130 goes back to its original shape after release of the force F.

In view of the above, the use of a deflectable member allows the thermometer probe of the invention to be well adapted to a patient's body cavity being measured. Additionally, the deflectable member is preferably made of a metal wire having a diameter of about 0.5 to 2.0 mm. Hence, the thermometer probe of the invention can be easily deflected and sustained in a bent form, thereby enhancing the probe life.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A deflectable thermometer probe comprising:
   a bendable probe body;
   a tip member secured to the bendable probe body and having a thermal contact surface;
   a thermal sensor mounted on the inside of the thermal contact surface of the tip member, for sensing the temperature of the thermal contact surface and producing a temperature signal;
   a set of lead wires coupled to the thermal sensor for transmission of the temperature signal; and
   a deflectable member having a main portion disposed in the bendable probe body, wherein deformation of the main portion occurs when the bendable probe body is subjected to a force, and the deformation cannot be undone by a return force from the bendable probe body when the applied force is removed, thereby the bendable probe body is sustained in a bent form;
   wherein a protecting head is formed at a front end of the deflectable member to avoid the deflectable member cutting off the lead wires.

2. The probe as recited in claim 1 wherein the main portion of the deflectable member is constructed by a deflectable metal wire.

3. The thermometer as recited in claim 2 wherein the deflectable metal wire is made of copper.

4. The probe as recited in claim 1 wherein the bendable probe body includes a hollow pipe and the main portion of the deflectable member is disposed in the hollow pipe.

5. The probe as recited in claim 4 wherein the hollow pipe has at least a portion with a diameter greater than that of the main portion of the deflectable member.

6. The probe as recited in claim 4 wherein the hollow pipe provides a space for the deformation of the main portion of the deflectable member.

7. The probe as recited in claim 4 wherein the lead wires run through the hollow pipe in the bendable probe body.

8. The probe as recited in claim 1 wherein the tip member is hollow.

9. A deflectable thermometer probe comprising:
   a bendable probe body;
   a tip member secured to the bendable probe body and having a thermal contact surface;
   a thermal sensor mounted on the inside of the thermal contact surface of the tip member, for sensing the temperature of the thermal contact surface and producing a temperature signal;
   a set of lead wires coupled to the thermal sensor for transmission of the temperature signal; and
   a deflectable member having a main portion disposed in the bendable probe body, wherein deformation of the main portion occurs when the bendable probe body is subjected to a force, and the deformation cannot be undone by a return force from the bendable probe body when the applied force is removed, thereby the bendable probe body is sustained in a bent form;
   wherein a groove is defined in the bendable probe body's end portion and a corresponding hook formed at a back end of the deflectable member is embedded in the groove.

10. The probe as recited in claim 9 wherein the main portion of the deflectable member is constructed by a deflectable metal wire.

11. The thermometer as recited in claim 10 wherein the deflectable metal wire is made of copper.

12. The probe as recited in claim 9 wherein the bendable probe body includes a hollow pipe and the main portion of the deflectable member is disposed in the hollow pipe.

13. The probe as recited in claim 12 wherein the hollow pipe has at least a portion with a diameter greater than that of the main portion of the deflectable member.

14. The probe as recited in claim 12 wherein the hollow pipe provides a space for the deformation of the main portion of the deflectable member.

15. The probe as recited in claim 12 wherein the lead wires run through the hollow pipe in the bendable probe body.

16. The probe as recited in claim 9 wherein the tip member is hollow.

* * * * *